US011111063B2

(12) United States Patent
Borg et al.

(10) Patent No.: US 11,111,063 B2
(45) Date of Patent: Sep. 7, 2021

(54) SEPARATABLE CONTAINER CARRIER

(71) Applicant: Oregon Precision Industries, Inc., Eugene, OR (US)

(72) Inventors: Zakary James Borg, Eugene, OR (US); Ronald Lee Mellor, Jr., Eugene, OR (US)

(73) Assignee: OREGON PRECISION INDUSTRIES, INC., Eugene, OR (US)

( * ) Notice: Subject to any disclaimer, the term of this patent is extended or adjusted under 35 U.S.C. 154(b) by 0 days.

(21) Appl. No.: 16/389,122

(22) Filed: Apr. 19, 2019

(65) Prior Publication Data

US 2019/0329951 A1    Oct. 31, 2019

Related U.S. Application Data

(60) Provisional application No. 62/664,912, filed on Apr. 30, 2018.

(51) Int. Cl.
| | |
|---|---|
| *B65D 71/50* | (2006.01) |
| *B29C 45/00* | (2006.01) |
| *B29L 31/00* | (2006.01) |
| *B29K 105/26* | (2006.01) |
| *B29K 23/00* | (2006.01) |

(52) U.S. Cl.
CPC ........ *B65D 71/504* (2013.01); *B29C 45/0081* (2013.01); *B29K 2023/065* (2013.01); *B29K 2105/26* (2013.01); *B29L 2031/712* (2013.01)

(58) Field of Classification Search
CPC .............. B65D 71/504; B29C 45/0081; B29K 2023/065; B29K 2105/26

USPC ....... 206/145, 147, 148, 149, 151, 150, 144, 206/192, 199, 158
See application file for complete search history.

(56) References Cited

U.S. PATENT DOCUMENTS

| | | | | |
|---|---|---|---|---|
| 3,038,602 A | * | 6/1962 | Rapata ................. | B65D 71/504 206/150 |
| 3,300,041 A | * | 1/1967 | Fuller ................ | B65D 71/0085 206/161 |
| 3,664,497 A | * | 5/1972 | Mascia ............. | B65D 17/4012 206/151 |
| 3,752,305 A | * | 8/1973 | Heyne .................... | B65D 71/50 206/147 |
| 4,372,598 A | * | 2/1983 | Quelch ................. | B65D 71/50 206/145 |

(Continued)

*Primary Examiner* — Jacob K Ackun
(74) *Attorney, Agent, or Firm* — Alleman Hall Creasman & Tuttle LLP

(57) ABSTRACT

A container carrier and manufacturing method therefor are provided. The container carrier may include an integrally molded body with a plurality of annular structures. Each annular structure may have a top surface, a side wall, a circumferential rib, and a plurality of inwardly projecting flanges. The plurality of flanges may be collectively configured to secure a corresponding container within the annular structure. A first annular structure may be detachably coupled to a second annular structure by a tearable first tab, and a third annular structure may be detachably coupled to a fourth annular structure by a tearable second tab. The container carrier may be configured to separate into a first truncated carrier and a second truncated carrier when tearing operations are performed on both the first tab and second tab.

13 Claims, 11 Drawing Sheets

(56) References Cited

U.S. PATENT DOCUMENTS

| | | | | |
|---|---|---|---|---|
| 4,712,680 A * | 12/1987 | Panazzolo | B65D 71/50 | 206/148 |
| 5,060,999 A * | 10/1991 | Marvin | B65D 71/504 | 294/87.2 |
| 5,105,964 A * | 4/1992 | Heath | B65D 43/0212 | 220/212 |
| 5,441,148 A * | 8/1995 | Appleton | B65D 71/504 | 206/150 |
| 5,480,204 A * | 1/1996 | Erickson | B65D 67/02 | 206/151 |
| 5,535,879 A * | 7/1996 | Appleton | B65D 71/504 | 206/144 |
| 5,609,247 A * | 3/1997 | Appleton | B65D 71/504 | 206/150 |
| 5,788,301 A * | 8/1998 | Slomski | B65D 71/504 | 294/87.2 |
| 5,791,463 A * | 8/1998 | Negelen | B65D 71/46 | 206/147 |
| 5,845,776 A * | 12/1998 | Galbierz | B65D 71/48 | 206/427 |
| 6,129,397 A * | 10/2000 | Borg | B65D 71/50 | 206/151 |
| 7,588,275 B2 * | 9/2009 | Borg | B65D 21/0224 | 206/151 |
| 7,614,495 B1 * | 11/2009 | Smithers | B65D 81/361 | 206/150 |
| 7,861,853 B2 * | 1/2011 | Borg | B65D 71/50 | 206/151 |
| 10,364,080 B2 * | 7/2019 | Tetreault | B65D 71/50 | |
| 2005/0167289 A1 * | 8/2005 | Borg | B65D 23/104 | 206/151 |
| 2007/0108069 A1 * | 5/2007 | Horton | B65D 71/50 | 206/151 |
| 2007/0181447 A1 * | 8/2007 | Olsen | B65D 71/504 | 206/150 |
| 2008/0224489 A1 * | 9/2008 | Borg | B65D 71/50 | 294/87.28 |
| 2012/0073997 A1 * | 3/2012 | Borg | B65D 21/0219 | 206/150 |
| 2015/0210428 A1 * | 7/2015 | Borg | B65D 21/0219 | 24/288 |

* cited by examiner

SEPARATABLE CONTAINER CARRIER

CROSS REFERENCE TO RELATED APPLICATIONS

This application claims priority to U.S. Provisional Patent Application No. 62/664,912 filed Apr. 30, 2018, the entirety of which is hereby incorporated herein by reference.

BACKGROUND

Container carriers are used to secure a group of containers so that they may be grasped and carried as a single unit. Manufacturers may desire to use a container carrier that holds a specific quantity of containers, which may be more than a user desires to carry or transport. However, the quantity of the containers to be secured by the container carrier is typically fixed, and removal of one or more containers from the container carrier may lead to an uneven distribution of weight when carried by a user.

SUMMARY

To address the above issues, a container carrier and manufacturing method for a container carrier are disclosed herein. According to a first aspect, a container carrier for securing together and carrying one or more containers comprising an integrally molded body including a plurality of annular structures is provided. Each annular structure may have a top surface, a side wall, and a circumferential rib with a plurality of flanges coupled to the circumferential rib. Each flange may include an inwardly projecting portion. A first annular structure may be detachably coupled to a second annular structure by a tearable first tab. A potential advantage of this configuration is that a user may separate the first annular structure from the second annular structure.

In this aspect, the first tab may include a first thin section in a first bridging portion arranged between the first and second annular structures, and the first tab may be configured to separate along the first thin section when a tearing operation is performed on the first tab to thereby physically detach the first annular structure from the second annular structure. A potential advantage of this configuration is that a user may easily separate the first annular structure from the second annular structure by pulling on the first tab.

In this aspect, the container carrier may further comprise a third annular structure fixedly coupled to the first annular structure by a first bridge and a fourth annular structure fixedly coupled to the second annular structure by a second bridge, and the third annular structure may be detachably coupled to the fourth annular structure by a tearable second tab. A potential advantage of this configuration is that a user may separate the third annular structure from the fourth annular structure.

In this aspect, the second tab may include a second thin section in a second bridging portion arranged between the third and fourth annular structures, and the second tab may be configured to separate along the second thin section when a tearing operation is performed on the second tab to thereby physically detach the third annular structure from the fourth annular structure. As such, the container carrier may be configured to separate into a first truncated carrier and a second truncated carrier when tearing operations are performed on both the first tab and second tab, with the first truncated carrier comprising the first and third annular structures and the second truncated carrier comprising the second and fourth annular structures. A potential advantage of this configuration is that a user may separate the container carrier into two, smaller container carriers.

In this aspect, the container carrier may further comprise at least two integrally formed handles. A potential advantage of this configuration is that each truncated carrier may include a handle when the container carrier is separated into truncated carriers.

In this aspect, the first truncated carrier and the second truncated carrier each include at least one integrally formed handle. A potential advantage of this configuration is that a user may easily carry the first and second truncated carriers.

In this aspect, the side wall of each annular structure may be formed of side wall portions separated by side wall voids formed in the side wall, and the top surface may connect the side wall portions. A potential advantage of this configuration is that the container carrier may be formed with less material while maintaining structural integrity.

In this aspect, the top surface connecting the side wall portions of each annular structure may include notched voids continuous with respective side wall voids such that the flanges positioned proximate bottom ends of each side wall void are accommodated by the notched voids in the top surface of a second, same-shaped container carrier when stacked. A potential advantage of this configuration is that the height profile of a stack of container carriers is optimized such that more container carriers fit into a shipping carton, thereby reducing shipping costs of transporting the container carriers from the manufacturer to the packaging and distribution center.

In this aspect, the plurality of flanges of each annular structure may be collectively configured to releasably engage a corresponding container. A potential advantage of this configuration is that multiple containers may be carried together yet individually removed from the container carrier In this aspect, the top surface of each annular structure may be configured to cover at least a circumferential portion of a top of a container secured within the annular structure such that access to an opening on the top of the container may be prevented while the container is secured within the annular structure. A potential advantage of this configuration is that accidental opening of, and/or tampering with, the containers may be prevented.

In this aspect, the container carrier may be formed of a flexible plastic. Potential advantages of this configuration are that the container carrier is lightweight yet durable and may be recycled after use, and further the flanges of the container carrier may flexibly deform to secure and release containers therein.

In another aspect, a manufacturing method for a container carrier for securing together and carrying one or more containers is provided. The method may include molding an integrally formed body including a plurality of annular structures, and forming each annular structure to have a top surface, a side wall, and a circumferential rib. The method may further include forming a plurality of flanges coupled to the circumferential rib, each flange including an inwardly projecting portion, and forming a first annular structure to be detachably coupled to a second annular structure by a tearable first tab such that removal of the first tab physically separates the first annular structure from the second annular structure. A potential advantage of this configuration is that a user may separate the first annular structure from the second annular structure.

In this aspect, the manufacturing method may further include forming the first tab to include a first thin section in a first bridging portion arranged between the first and second annular structures, and configuring the first tab to separate along the first thin section when a tearing operation is performed on the first tab to thereby physically detach the first annular structure from the second annular structure. A potential advantage of this configuration is that a user may easily separate the first annular structure from the second annular structure by pulling on the first tab.

In this aspect, the method may further include forming a third annular structure to be fixedly coupled to the first annular structure by a first bridge, forming a fourth annular structure to be fixedly coupled to the second annular structure by a second bridge, and forming the third annular structure to be detachably coupled to the fourth annular structure by a tearable second tab such that removal of the second tab physically separates the third annular structure from the fourth annular structure. A potential advantage of this configuration is that a user may separate the third annular structure from the fourth annular structure to separate the container carrier into two, smaller container carriers.

In this aspect, the manufacturing method may further include forming the second tab to include a second thin section in a second bridging portion arranged between the third and fourth annular structures, configuring the second tab to separate along the second thin section when a tearing operation is performed on the second tab to thereby physically detach the third annular structure from the fourth annular structure, and configuring the container carrier to separate into a first truncated carrier and a second truncated carrier when tearing operations are performed on both the first tab and second tab, the first truncated carrier comprising the first and third annular structures, and the second truncated carrier comprising the second and fourth annular structures. A potential advantage of this configuration is that a user may easily separate the third annular structure from the fourth annular structure by pulling on the second tab.

In this aspect, the method may further include forming the container carrier to include at least two integrally formed handles such that the first truncated carrier and the second truncated carrier each include at least one integrally formed handle. A potential advantage of this configuration is that each truncated carrier may include a handle when the container carrier is separated into truncated carriers such that a user may easily carry the first and second truncated carriers.

In this aspect, the method may further include molding the side wall of each annular structure to be formed of side wall portions separated by side wall voids, forming the top surface to connect the side wall portions, and forming notched voids in the top surface to be continuous with respective side wall voids such that flanges positioned proximate bottom ends of each side wall void are accommodated by the notched voids in the top surface of a second, same-shaped container carrier when stacked. A potential advantage of this configuration is that the height profile of a stack of container carriers is optimized such that more container carriers fit into a shipping carton, thereby reducing shipping costs of transporting the container carriers from the manufacturer to the packaging and distribution center.

In this aspect, the method may further include forming the top surface of each annular structure to include a central raised structure that is configured to encompass a cap of a container secured within the annular structure such that the cap cannot be removed while the container is secured within the annular structure. A potential advantage of this configuration is that accidental opening of, and/or tampering with, the containers may be prevented.

In this aspect, the method may further include forming the top surface of each annular structure to cover at least a circumferential portion of a top of a container secured within the annular structure such that an opening on the top of the container cannot be accessed while the container is secured within the annular structure. A potential advantage of this configuration is that accidental opening of, and/or tampering with, the containers may be prevented.

In this aspect, the method may further include forming the container carrier of a flexible plastic. Potential advantages of this configuration are that the container carrier is lightweight yet durable and may be recycled after use, and further the flanges of the container carrier may flexibly deform to secure and release containers therein.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

First Embodiment

Figure 1:
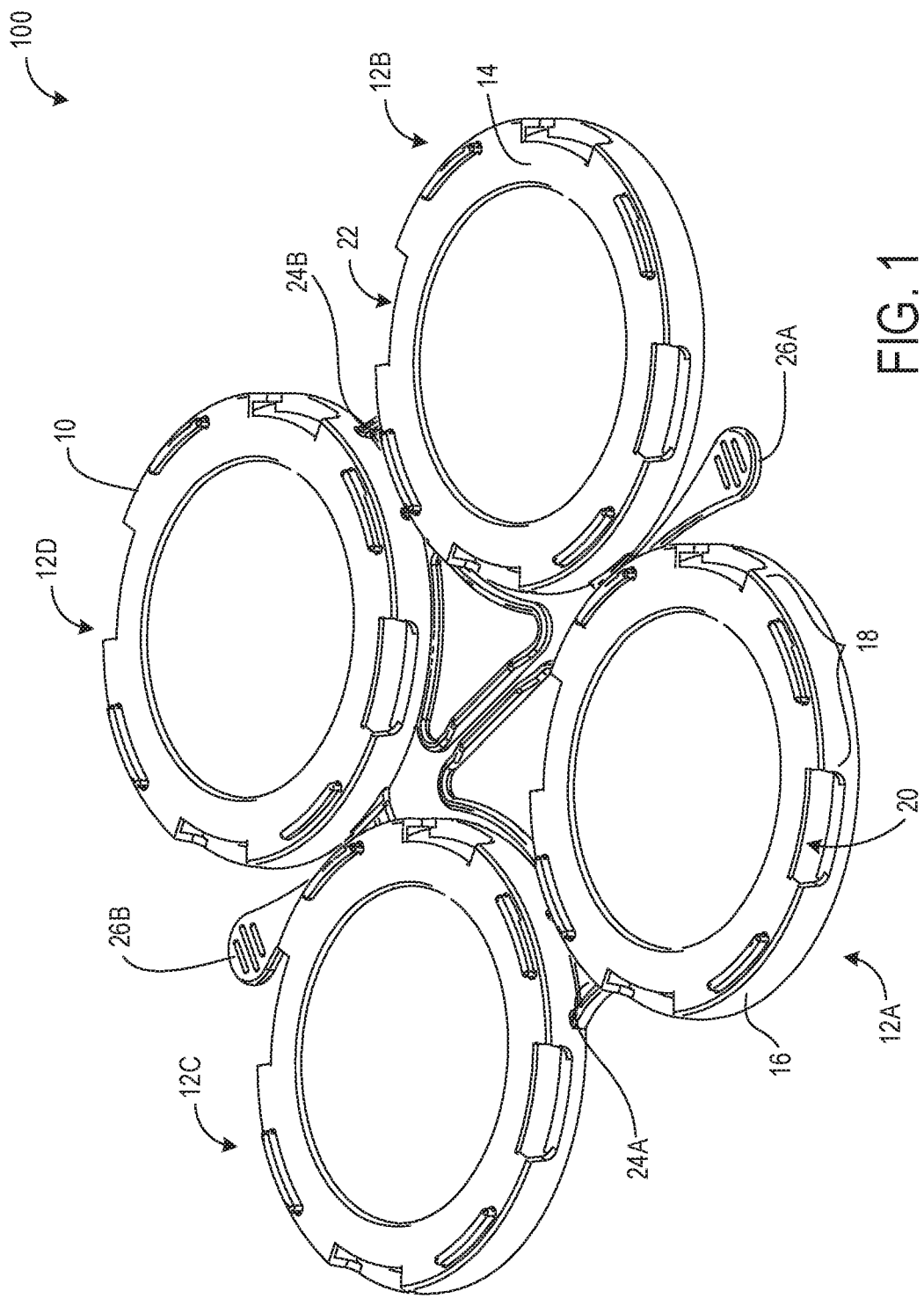
FIG. 1 shows a top perspective view of a container carrier according to one embodiment of the present description.

Turning to the figures, FIG. 1 illustrates a top perspective view of one embodiment of a container carrier 100 configured to secure together and carry one or more containers at one time. The body 10 of the container carrier 100 may be integrally molded and may include a plurality of annular structures 12. Each annular structure 12 may have a top surface 14 and a side wall 16. The side wall 16 of each annular structure 12 may be formed of side wall portions 18 separated by side wall voids 20 formed in the side wall 16. The top surface 14 may connect the side wall portions 18 and may include notched voids 22 continuous with respective side wall voids 20. In the illustrated embodiment, the center of each annular structure 12 includes a void, V. However, it will be appreciated that the center of each annular structure 12 may be alternatively formed as a solid surface lacking the void V.

The container carrier 100 may include a first annular structure 12A and a second annular structure 12B. In the illustrated embodiment, the container carrier 100 further includes a third annular structure 12C and a fourth annular structure 12D. As shown, the third annular structure 12C may be fixedly coupled to the first annular structure 12A by a first bridge 24A. The fourth annular structure 12D may be fixedly coupled to the second annular structure by a second bridge 24B. The first annular structure 12A may be detachably coupled to the second annular structure 12B by a tearable first tab 26A, and the third annular structure 12C may be detachably coupled to a fourth annular structure 12D by a tearable second tab 26B.

Figure 2:
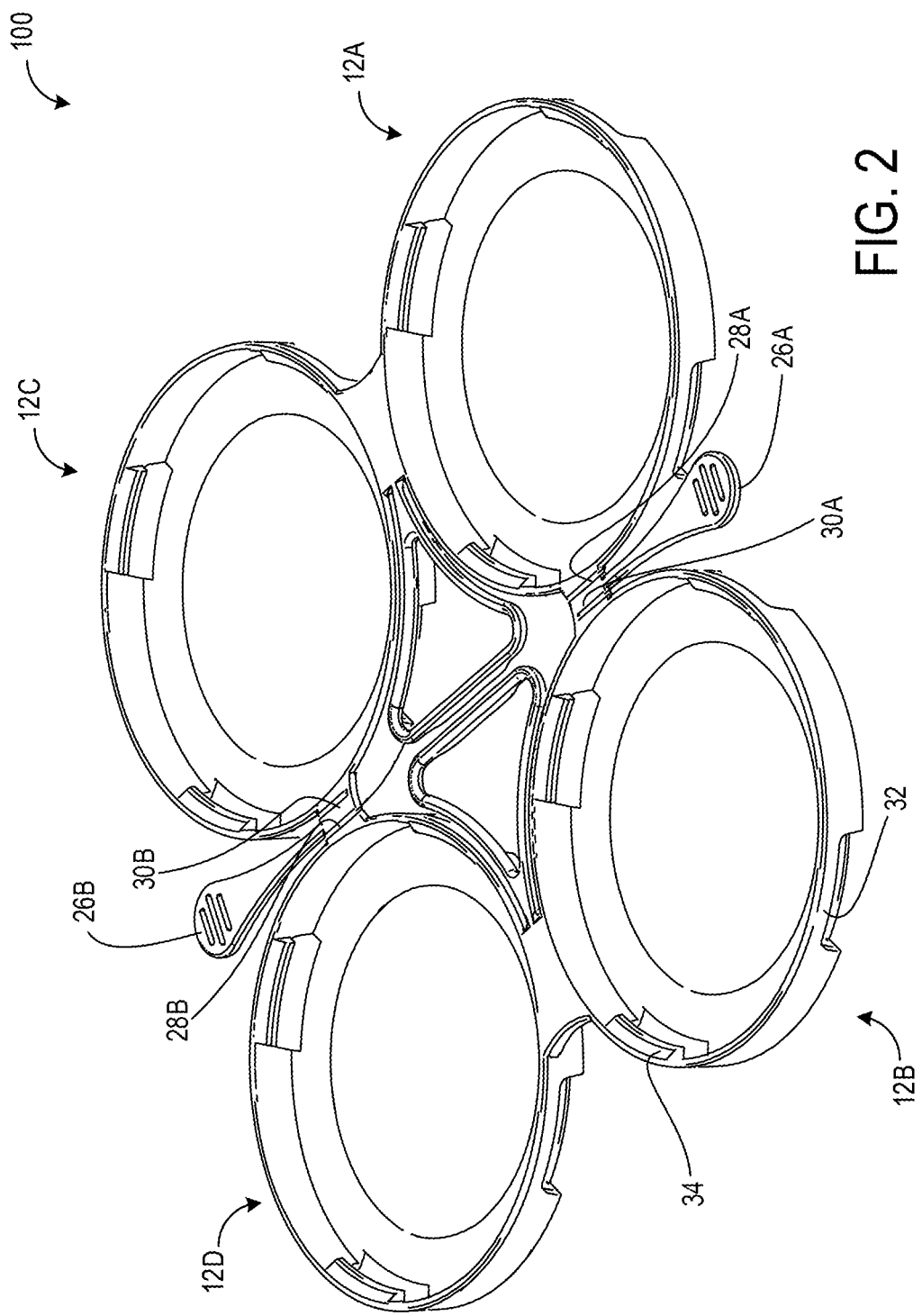
FIG. 2 shows a bottom perspective view of the container carrier of FIG. 1.

FIG. 2 shows a bottom perspective of the container carrier 100 of FIG. 1. As illustrated, the first tab 26A may include a first thin section 28A in a first bridging portion 30A that is arranged between the first and second annular structures 12A, 12B. The first tab 26A may be configured to separate along the first thin section 28A when a tearing operation is performed on the first tab 26A. Such a tearing operation may physically detach the first annular structure 12A from the second annular structure 12B. Like the first tab 26A, the second tab 26B may include a second thin section 28B in a second bridging portion 30B that is arranged between the third and fourth annular structures 12C, 12D, and the second tab 26B may be configured to separate along the second thin section 28B when a tearing operation is performed on the second tab 26B. Such a tearing operation may physically detach the third annular structure 12C from the fourth annular structure 12D.

Accordingly, as described in detail below with reference to FIG. 5, the container carrier 100 may be configured to separate into two truncated carriers when tearing operations are performed on both the first and second tabs 26A, 26B. While a thickness of the body 10 of the container carrier 100 may be in a range of 0.04 inches to 0.05 inches, a thickness of the thin sections 28A, 28B of the container carrier 100 is substantially thinner and may be in range of 0.01 inches to 0.02 inches. It will be appreciated that the difference in thickness between the body 10 and the thin sections 28A, 28B of the container carrier 100 facilitates the detachment of the first annular structure 12A from the second annular structure 12B, and/or the detachment of the third annular structure 12C from the fourth annular structure 12D, without affecting the integrity of any other feature of the container carrier 100.

As shown in FIG. 2, each annular structure 12 may include a circumferential rib 32 and a plurality of inwardly projecting flanges 34 collectively configured to releasably engage a corresponding container secured within the annular structure 12. The inwardly projecting flanges may be oriented upwardly at an angle of inclination, with the angle of inclination from horizontal being in a range of 0 degrees to 50 degrees, and more preferably in a range of 20 degrees to 40 degrees.

As shown, the flanges 34 may be positioned proximate bottom ends of each side wall void 20 in an annular structure 12. As described above, the top surface 14 of the annular structure 12 connects the side wall portions 18 and includes notched voids 22 that are continuous with respective side wall voids 20. With this configuration, the flanges 34 may be accommodated by the respective notched voids 22 in the top surface 14 of a second, same-shaped container carrier 100 when stacked.

Figure 3:
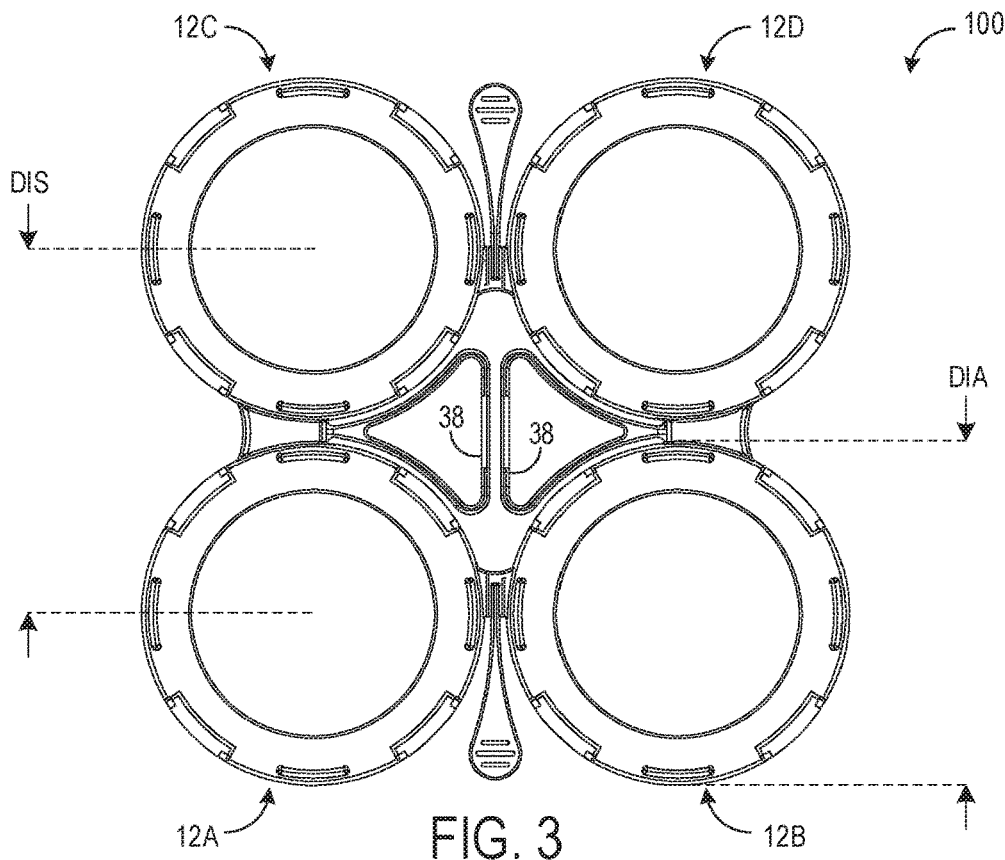
FIG. 3 shows a top view of the container carrier of FIG. 1.
Figure 4:
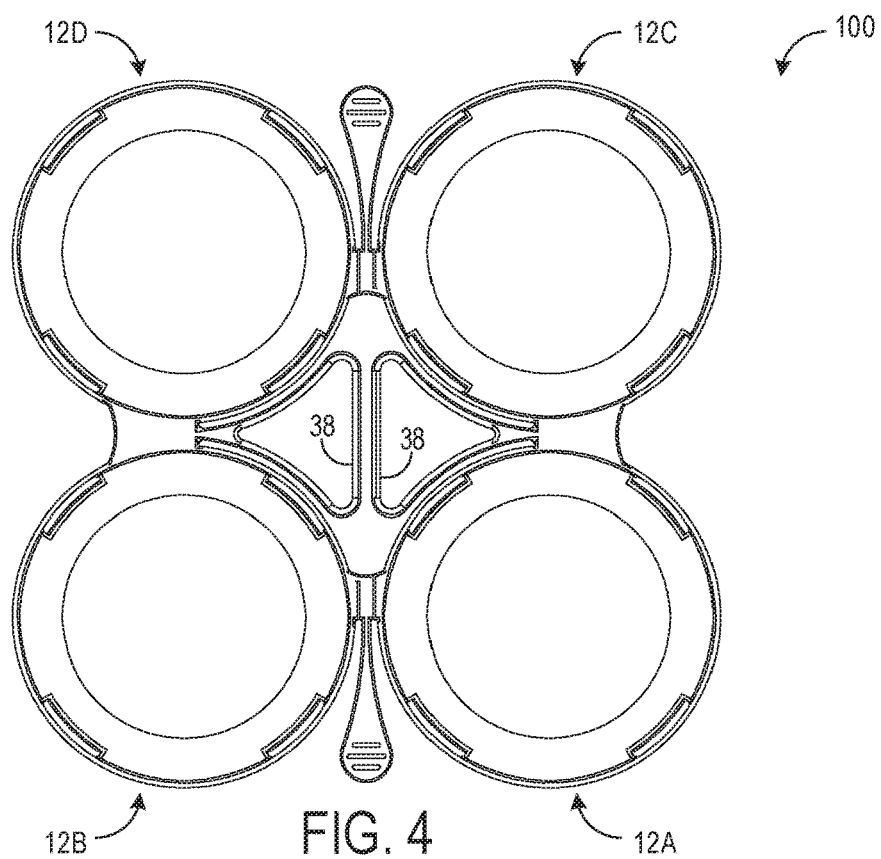
FIG. 4 shows a bottom view of the container carrier of FIG. 1.

FIGS. 3 and 4 show top and bottom views of the container carrier 100 of FIG. 1, respectively. As shown in FIG. 3, a distance DIS can be measured between the centers of adjacent annular structures 12. The distance DIS between the centers of adjacent annular structures 12 may be in a range of 2 inches to 4 inches, depending upon a size of a container CON for which the container carrier 100 is intended to secure. Additionally, a diameter DIA of each annular structure 12 may be in a range of 2 inches to 3 inches. Like the distance DIS between the centers of adjacent annular structures 12, the diameter DIA of each annular structure depends upon the size of the container CON for which the container carrier 100 is intended to secure.

As illustrated in FIGS. 3 and 4, the container carrier 100 may include at least two integrally formed handles 38. The handles 38 may be configured to be grasped by a user for lifting and carrying the container carrier 100. While the handles 38 depicted in FIGS. 3 and 4 are both substantially triangular, it will be appreciated that the handles 38 may be formed in any number of shapes, and the shapes of the handles 38 may be unique from one another within the same container carrier 100.

Figure 5:
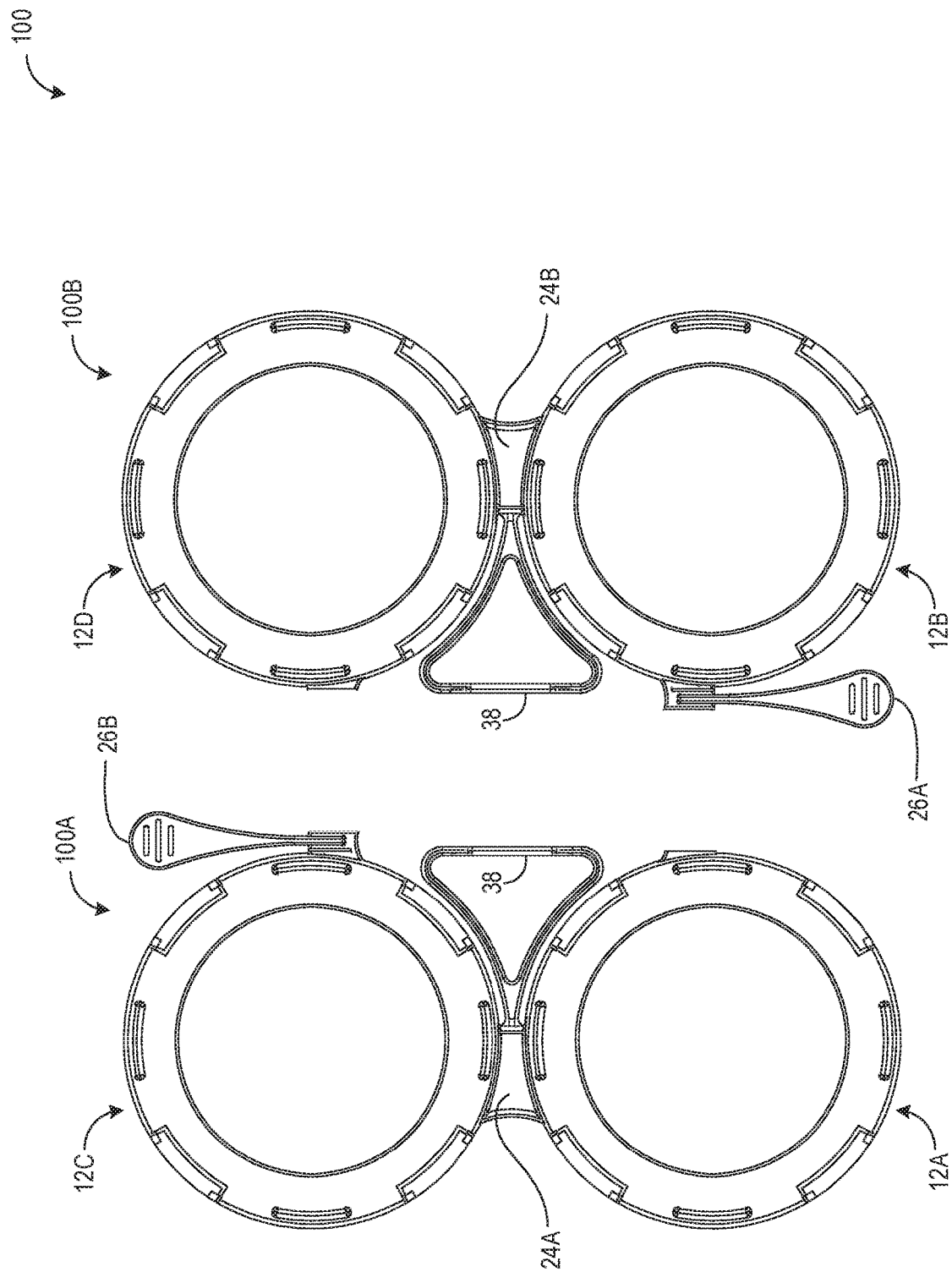
FIG. 5 shows a top view of the container carrier of FIG. 1 separated into two truncated carriers.

FIG. 5 shows a top view of the container carrier 100 of FIG. 1 separated into two truncated carriers 100A and 100B. As described above, the third annular structure 12C may be fixedly attached to the first annular structure 12A by a first bridge 24A, and the fourth annular structure 12D may be fixedly attached to the second annular 12B structure by a second bridge 24B. When tearing operations are performed on both the first and second tabs 26A, 26B, the container carrier 100 may be configured to separate into a first truncated carrier 100A and a second truncated carrier 100B. The first truncated carrier 100A may include the first and third annular structures 12A, 12C, and the second truncated carrier 100B may include the second and fourth annular structures 12B, 12D. As shown, the separation of the container carrier 100 into two truncated carriers 100A, 100B is configured such that the first truncated carrier 100A and the second truncated carrier 100B each include at least one integrally formed handle 38. While the first and second tabs 26A, 26B are illustrated as being detached from the first and fourth annular structures 12A, 12D, respectively, it will be appreciated that the first tab 26A may instead detach from the second annular structure 12B and remain attached to the first annular structure 12A. Likewise, the second tab 26B may instead detach from the third annular structure 12C and remain attach to the fourth annular structure 12D. Alternatively, either or both of the first and second tabs 26A, 26B may become entirely detached from the first and second truncated carriers 100A, 100B.

Figure 6:
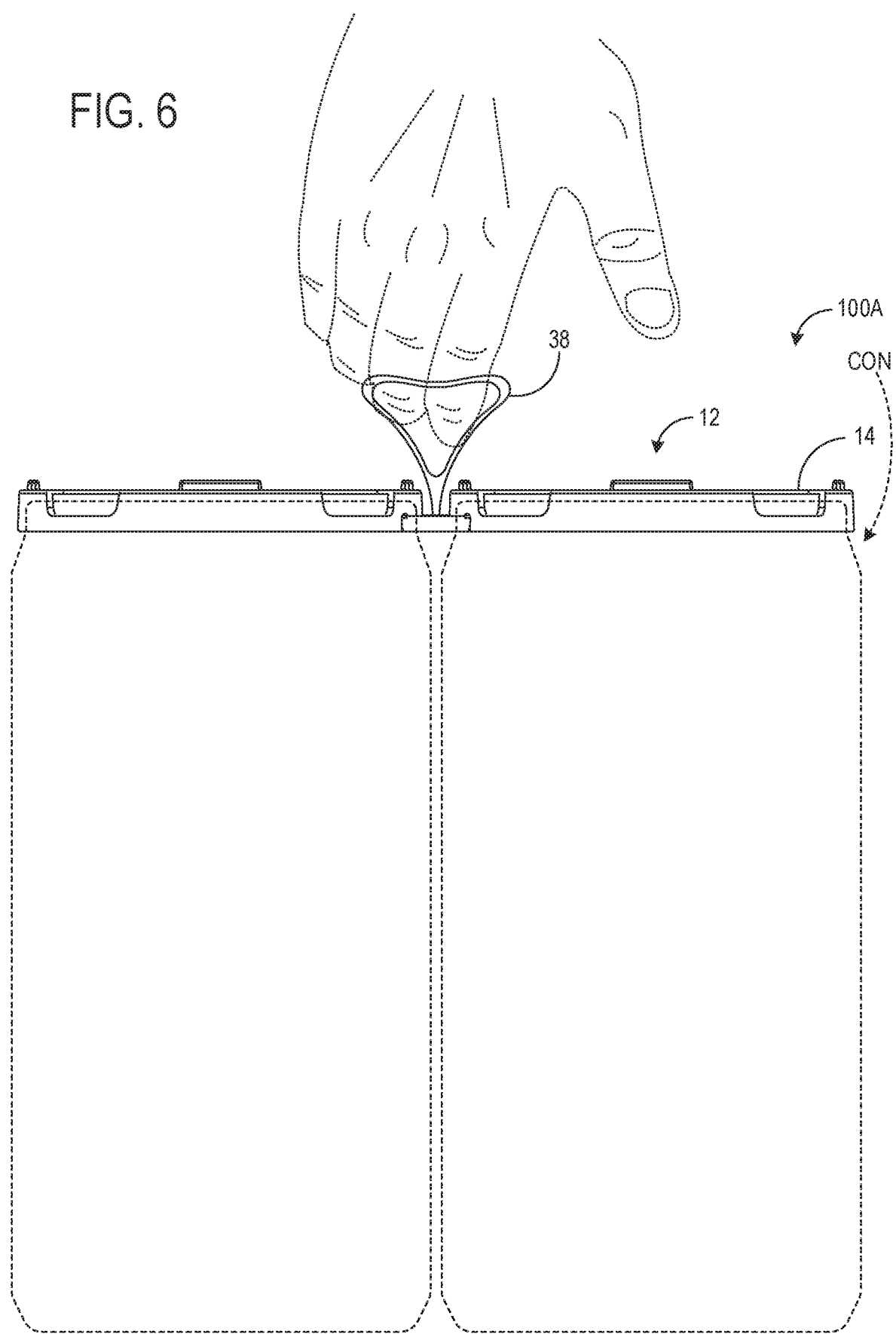
FIG. 6 shows a side view of a truncated carrier of FIG. 5 with two containers secured therein.

FIG. 6 shows a side view of the truncated carrier 100A with two containers CON, indicated by dashed lines, secured therein. As illustrated with reference to FIG. 1, the top surface 14 of the annular structure 12 may be configured to cover at least a circumferential portion of a top of a container CON secured within the annular structure 12 such that access to an opening on the top of the container CON is prevented while the container CON is secured within the annular structure 12. As discussed above and shown in FIG. 1, the truncated carrier 100A may include at least one integrally formed handle 38 that a user may grasp to lift and carry the truncated carrier 100A.

Second Embodiment

Looking now at FIGS. 7-12, a second embodiment of a container carrier 200 is illustrated. Since the container carrier 200 of the second embodiment is generally similar to that of a container carrier 100 of the first embodiment, the detailed description thereof is abbreviated for the sake of brevity. It is to be noted that like parts are designated by like reference numerals throughout the detailed description and the accompanying drawings.

Figure 7:
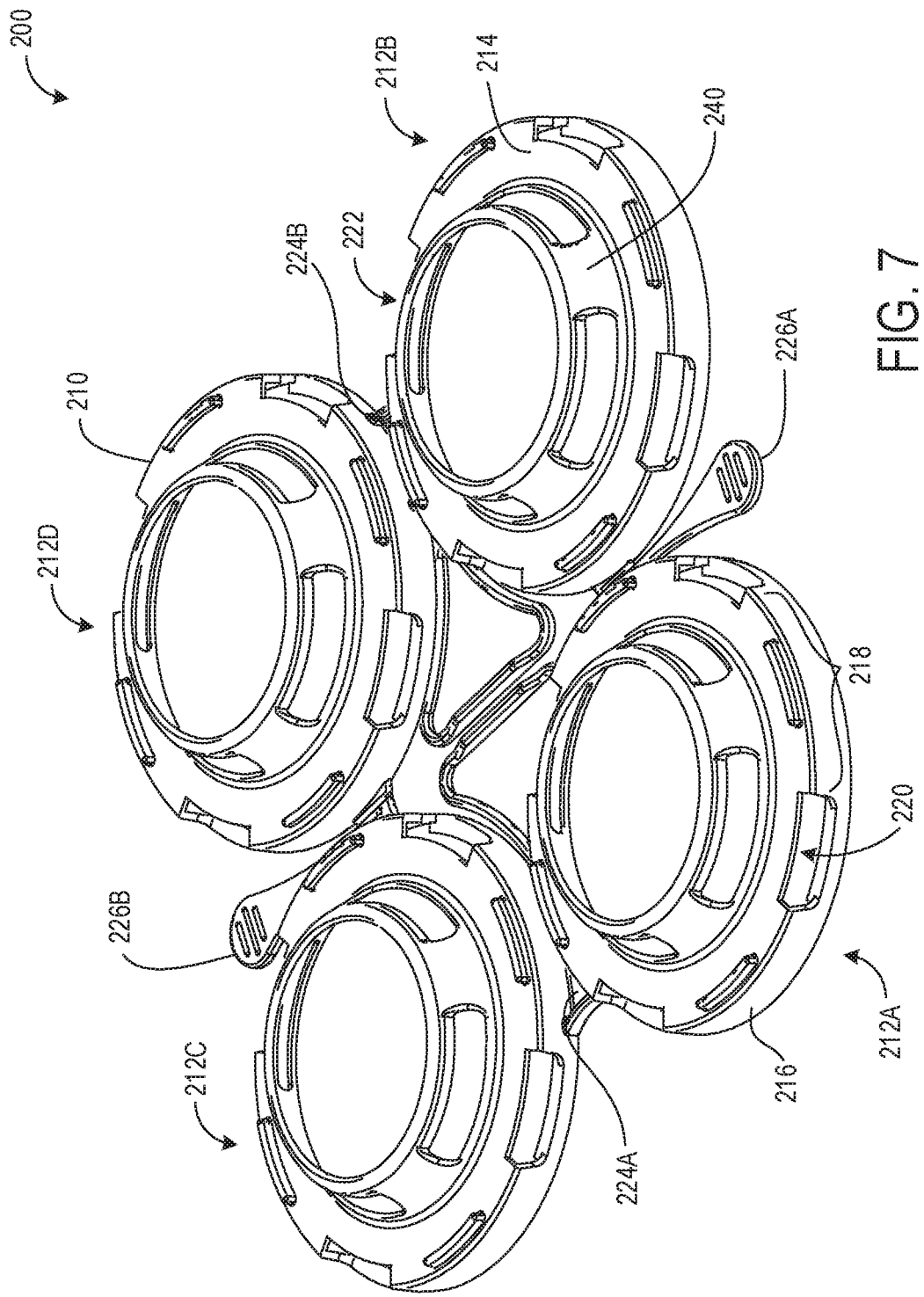
FIG. 7 shows a top perspective view of a container carrier according to a second embodiment of the present description.
Figure 8:
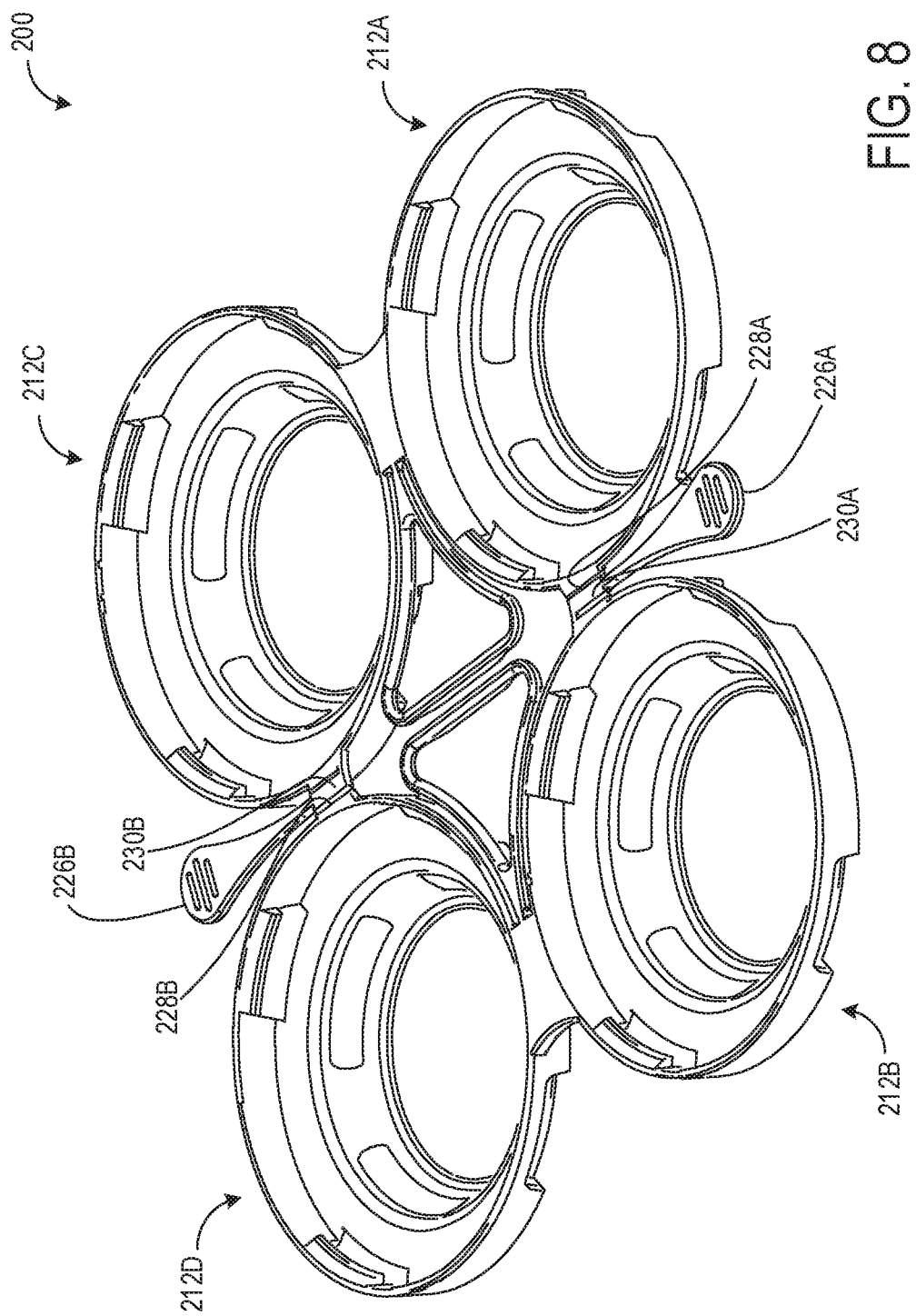
FIG. 8 shows a bottom perspective view of the container carrier of FIG. 7.

FIGS. 7 and 8 illustrate top and bottom perspective views, respectively, of the second embodiment of the container carrier 200. As shown in FIG. 7, the container carrier 200 may include a first annular structure 212A and a second annular structure 212B. The first annular structure 212A may be detachably coupled to the second annular structure 212B by a tearable first tab 226A. The container carrier 200 may further comprise a third annular structure 212C and a fourth annular structure 212D. The third annular structure 212C may be detachably coupled to the fourth annular structure 212D by a tearable second tab 226B. As discussed below with reference to FIG. 12, the top surface 214 of each annular structure 212 may further include a central raised structure 240 that may be configured to accommodate a cap of a container secured within the annular structure 212. In the illustrated embodiment, the central raised structure 240 has a central opening; however, it will be appreciated that the central raised structure 240 may alternatively include a partially or completely solid top surface. In the illustrated embodiment, the center of the central raised structure 240 of each annular structure 212 includes a void, V. However, it will be appreciated that the central raised structure 240 of each annular structure 212 may be alternatively formed as a solid surface lacking the void V.

As shown in FIG. 8, the first tab 226A may include a first thin section 228A in a first bridging portion 230A that is arranged between the first and second annular structures 212A, 212B. As described above, the first tab 226A may be configured to separate along the first thin section 228A when a tearing operation is performed on the first tab 226A. Such a tearing operation may physically detach the first annular structure 212A from the second annular structure 212B. Like the first tab 226A, the second tab 226B may include a second thin section 228B in a second bridging portion 230B that is arranged between the third and fourth annular structures 212C, 212D, and the second tab 226B may be configured to separate along the second thin section 228B when a tearing operation is performed on the second tab 226B. Such a tearing operation may physically detach the third annular structure 212C from the fourth annular structure 212C.

Figure 9:
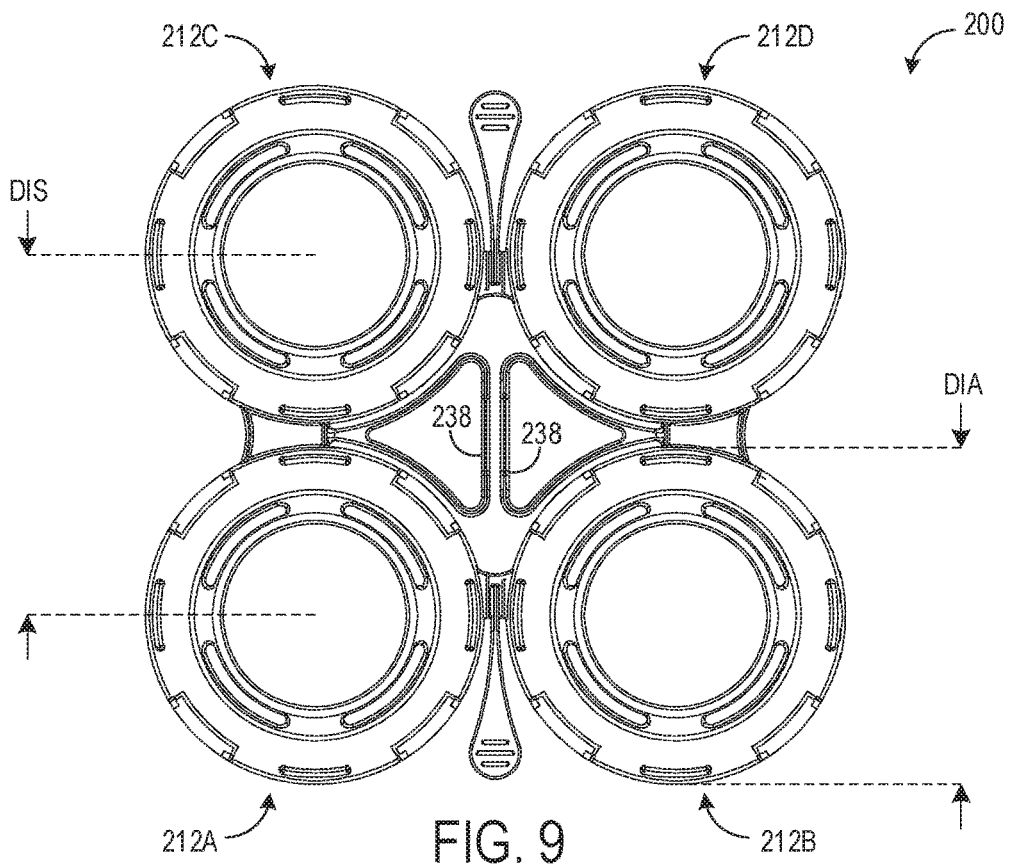
FIG. 9 shows a top view of the container carrier of FIG. 7.
Figure 10:
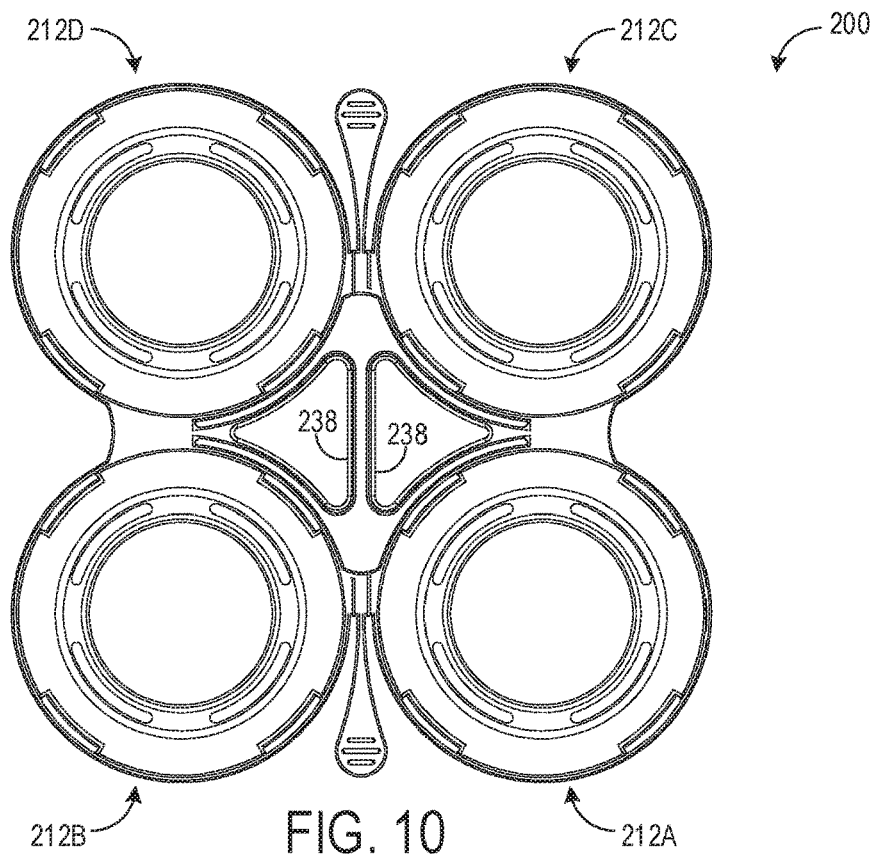
FIG. 10 shows a bottom view of the container carrier of FIG. 7.

FIGS. 9 and 10 show top and bottom views of the container carrier 200 of FIG. 7, respectively. As described above with reference to the first embodiment and shown in FIG. 9, a distance DIS can be measured between the centers of adjacent annular structures 212. The distance DIS between the centers of adjacent annular structures 212 may be in a range of 2 inches to 4 inches, depending upon a size of a container CON for which the container carrier 200 is intended to secure. Additionally, a diameter DIA of each annular structure 212 may be in a range of 2 inches to 3 inches. Like the distance DIS between the centers of adjacent annular structures 212, the diameter DIA of each annular structure depends upon the size of the container CON for which the container carrier 200 is intended to secure.

As illustrated in FIGS. 9 and 10, the container carrier 200 may include at least two integrally formed handles 238. The handles 238 may be configured to be grasped by a user for lifting and carrying the container carrier 200. While the handles 238 depicted in FIGS. 9 and 10 are both substantially triangular, it will be appreciated that the handles 238 may be formed in any number of shapes, and the shapes of the handles 238 may be unique from one another within the same container carrier 200.

Figure 11:
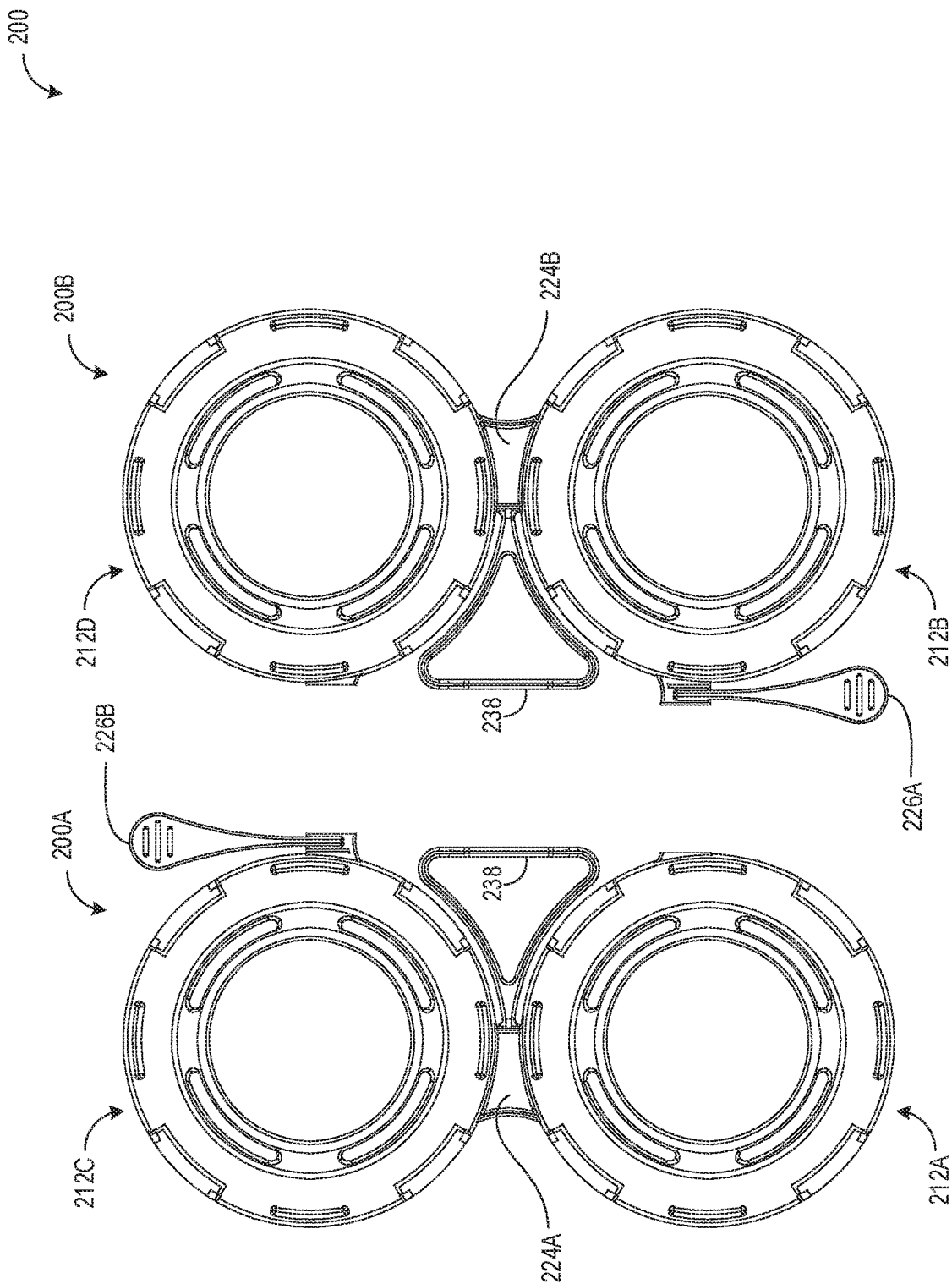
FIG. 11 shows a top view of the container carrier of FIG. 7 separated into two truncated carriers.

FIG. 11 shows a top view of the container carrier 200 of FIG. 7 separated into two truncated carriers 200A, 200B. As illustrated, the third annular structure 212C is fixedly attached to the first annular structure 212A by a first bridge 224A, and the fourth annular structure 212D is fixedly attached to the second annular 212B structure by a second bridge 224B. When tearing operations are performed on both the first and second tabs 226A, 226B, the container carrier 200 may be configured to separate into a first truncated carrier 200A and a second truncated carrier 200B. As shown, the first truncated carrier 200A and the second truncated carrier 200B each include at least one integrally formed handle 238. While the first and second tabs 226A, 226B are illustrated as being detached from the first and fourth annular structures 212A, 212D, respectively, it will be appreciated that the first tab 226A may instead detach from the second annular structure 212B and remain attached to the first annular structure 212A. Likewise, the second tab 226B may instead detach from the third annular structure 212C and remain attach to the fourth annular structure 212D. Alternatively, either or both of the first and second tabs 226A, 226B may become entirely detached from the first and second truncated carriers 200A, 200B.

Figure 12:
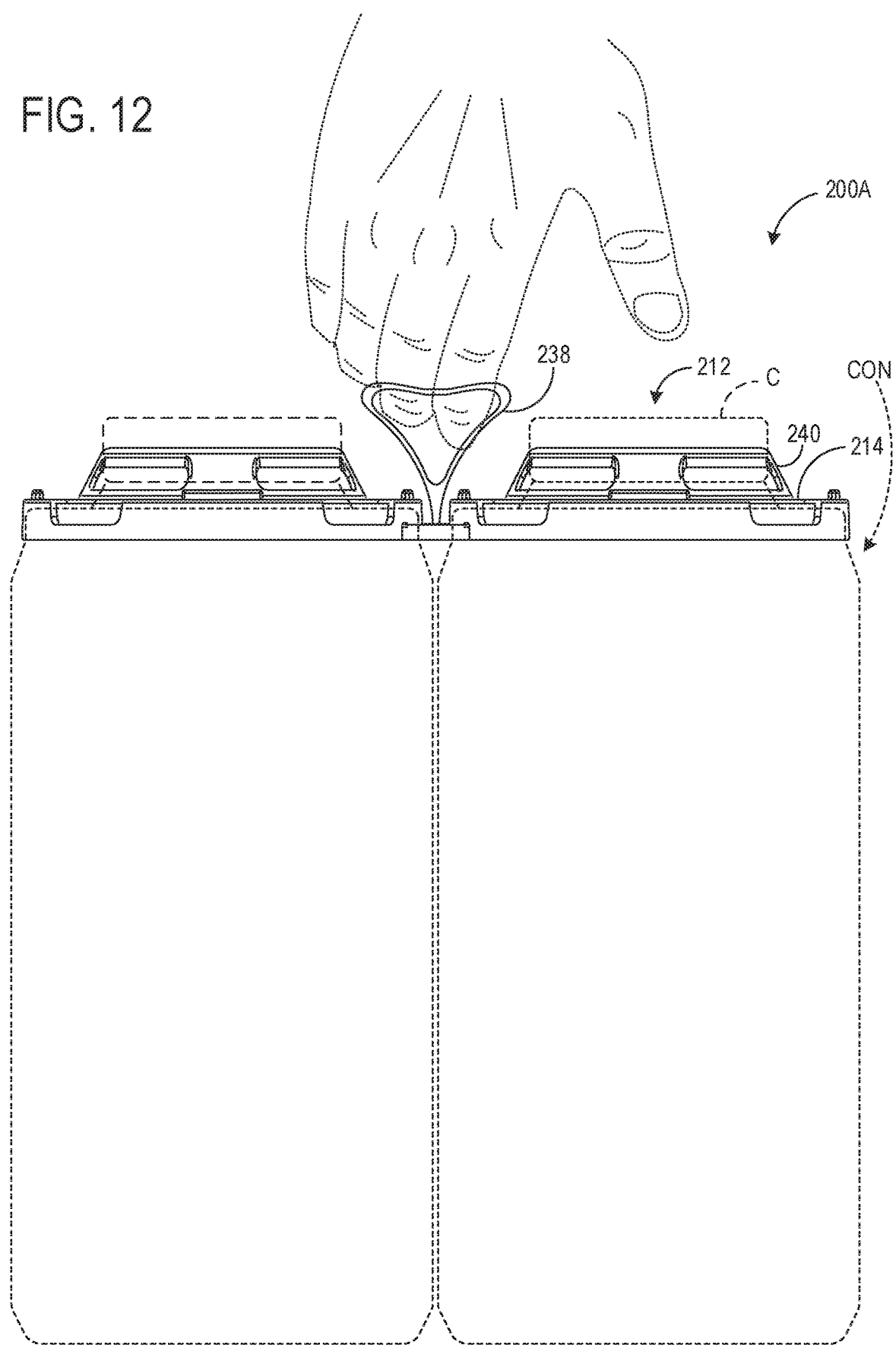
FIG. 12 shows a side view of a truncated carrier of FIG. 12 with two containers secured therein.

FIG. 12 shows a side view of the truncated carrier 200A with two containers CON, indicated by dashed lines, secured therein. As illustrated, the central raised structure 240 of the top surface 214 of the annular structure 212 may be configured to encompass a cap C of a container CON secured within the annular structure 212 such that removal of the cap C is prevented while the container CON is secured within the annular structure 212. As discussed above and shown in FIG. 12, the truncated carrier 200A may include at least one integrally formed handle 238 that a user may grasp to lift and carry the truncated carrier 200A.

Figure 13:
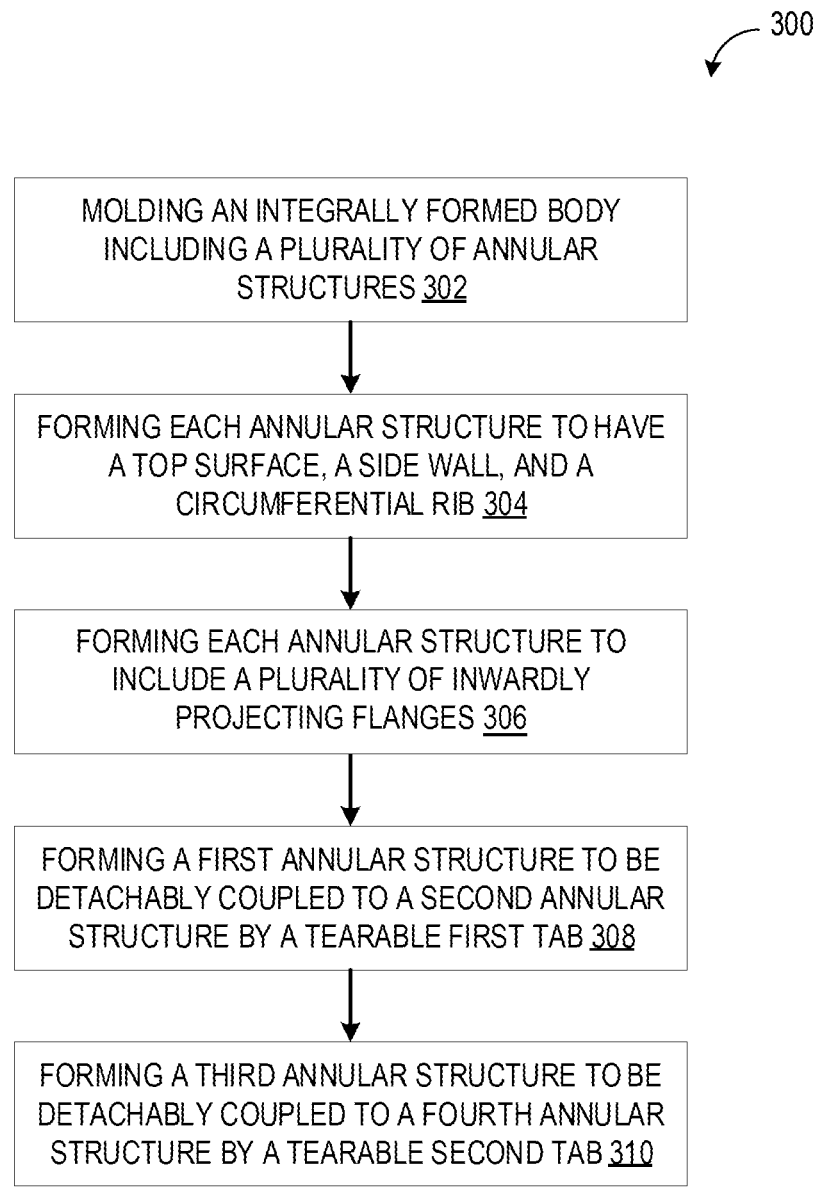
FIG. 13 shows a flowchart of a method for manufacturing the container carrier of FIG. 1.

FIG. 13 shows a method 300 for manufacturing the container carrier 100. At step 302, the method 300 may include molding an integrally formed body including a plurality of annular structures. At step 304, the method 300 may include forming each annular structure to have a top surface, a side wall, and a circumferential rib. As described above, the side wall of each annular structure may be formed of side wall portions separated by side wall voids. The top surface may be formed to connect the side wall portions, and notches in the top surface may be formed to be continuous with respective side wall voids.

In some embodiments, the top surface of each annular structure may be formed to cover at least a circumferential portion of a top of a container that is secured within the annular structure. This configuration prevents an opening on the top of the container from being accessed while the container is secured within the annular structure. In some embodiments, the top surface may include a central raised structure that is configured to encompass a cap of a container secured within the annular structure such that the cap cannot be removed while the container is secured within the annular structure.

At step 306, the method 300 may include forming each annular structure to include a plurality of inwardly projecting flanges. As described above, the flanges may be positioned proximate bottom ends of each side wall void such that they are accommodated by the notched voids in the top surface of a second, same shaped container carrier when stacked. The flanges may be collectively configured to releasable engage a container.

At step 308, the method 300 may include forming a first annular structure to be detachably coupled to a second annular structure by a tearable first tab such that removal of the first tab physically separates the first annular structure from the second annular structure. As described above, the first tab may include a first thin section in a first bridging portion that is arranged between the first and second annular structures, and the first tab may be configured to separate along the first thin section when a tearing operation is performed on the first tab.

At step 310, the method 300 may include forming a third annular structure to be detachably coupled to a fourth annular structure by a tearable second tab such that removal of the second tab physically separates the third annular structure from the fourth annular structure. As described above, the second tab may include a second thin section in a second bridging portion that is arranged between the third and fourth annular structures, and the second tab may be configured to separate along the second thin section when a tearing operation is performed on the second tab. The third annular structure may be fixedly coupled to the first annular structure by a first bridge, and the fourth annular structure may be fixedly coupled to the second annular structure by a second bridge. As such, when tearing actions are performed on the first and second tabs, the container carrier may be separated into a first truncated carrier and a second truncated carrier.

In any of the embodiments described herein, the container carrier may be preferentially formed of a flexible plastic. Being both strong and lightweight, plastic is an advantageous material for use in container carriers. It is preferable that the plastic be flexible in nature to accommodate the separation of the tearable tab along the thin section, the bendability of the handle as it is grasped to lift the container carrier, and the releasable engagement of the container CON collectively secured by the flanges. Specifically, the plastic may be high density polyethylene (HDPE), and it may further be recycled HDPE. It will be appreciated that container carriers formed of flexible plastic have the additional benefit of being recyclable.

In any of the embodiments described herein, the body of the container carrier is preferentially formed by injection molding; however, it will be appreciated that another suitable molding technique may be employed to form the body of the container carrier.

The container carriers described above may be used to provide a convenient carrying mechanism for containers of all sorts, but are particularly advantageous due to the manner in which tearing operations may be performed on tearable tabs to separate the container carrier into multiple truncated carriers. The container carriers described herein allow a user to separate the container carrier into truncated carriers for convenience in transportation and storage of the containers secure therein.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A container carrier for securing together and carrying one or more containers comprising:
an integrally molded body including a plurality of annular structures, wherein
each annular structure has a top surface, a side wall, and a plurality of inwardly projecting flanges,
a first annular structure is detachably coupled to a second annular structure by a tearable first tab, the first tab including a first thin section in a first bridging portion arranged between the first and second annular structures,
the first tab is configured to separate along the first thin section when a tearing operation is performed on the first tab to thereby physically detach the first annular structure from the second annular structure,
a third annular structure is detachably coupled to a fourth annular structure by a tearable second tab, the second tab including a second thin section in a second bridging portion arranged between the third and fourth annular structures,
the second tab is configured to separate along the second thin section when a tearing operation is performed on the second tab to thereby physically detach the third annular structure from the fourth annular structure,
when tearing operations are performed on both the first tab and second tab, the container carrier separates into a first truncated carrier and a second truncated carrier, the first truncated carrier comprising the first and third annular structures, and the second truncated carrier comprising the second and fourth annular structures, and
the first tab and the second tab remain attached to one of the first truncated carrier and the second truncated carrier after the container carrier is separated into the first truncated carrier and the second truncated carrier.

2. The container carrier of claim 1, wherein the first truncated carrier and the second truncated carrier each include at least one integrally formed handle.

3. The container carrier of claim 1, wherein
the side wall of each annular structure is formed of side wall portions separated by side wall voids formed in the side wall, and
the top surface connects the side wall portions.

4. The container carrier of claim 1, wherein
the top surface connecting the side wall portions of each annular structure includes notched voids continuous with respective side wall voids such that the flanges positioned proximate bottom ends of each side wall void are accommodated by the notched voids in the top surface of a second, same-shaped container carrier when stacked.

5. The container carrier of claim 1, wherein
the plurality of flanges of each annular structure are collectively configured to releasably engage a corresponding container.

6. The container carrier of claim 1, wherein
the top surface of each annular structure is configured to cover at least a circumferential portion of a top of a container secured within the annular structure such that access to an opening on the top of the container is prevented while the container is secured within the annular structure.

7. The container carrier of claim 1, wherein
the container carrier is formed of a flexible plastic.

8. A manufacturing method for a container carrier for securing together and carrying one or more containers, the method comprising:
molding an integrally formed body including a plurality of annular structures;

forming each annular structure to have a top surface, a side wall, and a plurality of inwardly projecting flanges;

forming a first annular structure to be detachably coupled to a second annular structure by a tearable first tab;

forming the first tab to include a first thin section in a first bridging portion arranged between the first and second annular structures;

configuring the first tab to separate along the first thin section when a tearing operation is performed on the first tab to thereby physically detach the first annular structure from the second annular structure;

forming a third annular structure to be detachably coupled to a fourth annular structure by a tearable second tab;

forming the second tab to include a second thin section in a second bridging portion arranged between the third and fourth annular structures;

configuring the second tab to separate along the second thin section when a tearing operation is performed on the second tab to thereby physically detach the third annular structure from the fourth annular structure;

forming the container carrier to separate into a first truncated carrier and a second truncated carrier when tearing operations are performed on both the first tab and second tab, the first truncated carrier comprising the first and third annular structures, and the second truncated carrier comprising the second and fourth annular structures; and configuring the first tab and the second tab to remain attached to one of the first truncated carrier and the second truncated carrier after the container carrier is separated into the first truncated carrier and the second truncated carrier.

9. The manufacturing method for a container carrier of claim 8, the method further comprising:

forming the container carrier to include at least two integrally formed handles such that the first truncated carrier and the second truncated carrier each include at least one integrally formed handle after the container carrier is separated into the first truncated carrier and the second truncated carrier.

10. The manufacturing method for a container carrier of claim 8, the method further comprising:

molding the side wall of each annular structure to be formed of side wall portions separated by side wall voids;

forming the top surface to connect the side wall portions; and forming notched voids in the top surface to be continuous with respective side wall voids such that flanges positioned proximate bottom ends of each side wall void are accommodated by the notched voids in the top surface of a second, same-shaped container carrier when stacked.

11. The manufacturing method for a container carrier of claim 8, the method further comprising:

forming the top surface of each annular structure to cover at least a circumferential portion of a top of a container secured within the annular structure such that an opening on the top of the container cannot be accessed while the container is secured within the annular structure.

12. The manufacturing method for a container carrier of claim 8, the method further comprising:

forming the container carrier of a flexible plastic.

13. A container carrier for securing together and carrying multiple containers comprising:

an integrally molded body including a plurality of annular structures, wherein each annular structure has a top surface, a side wall, and a plurality of inwardly projecting flanges, the top surface of each annular structure includes a central raised structure configured to encompass a cap of a container secured within the annular structure such that the cap cannot be removed while the container is secured within the annular structure;

a first annular structure is detachably coupled to a second annular structure by a tearable first tab;

a third annular structure is detachably coupled to a fourth annular structure by a tearable second tab;

the third annular structure is fixedly coupled to the first annular structure by a first bridge;

fourth annular structure fixedly coupled to the second annular structure by a second bridge;

the first tab includes a first thin section in a first bridging portion arranged between the first and second annular structures, the first tab being configured to separate along the first thin section when a tearing operation is performed on the first tab to thereby physically detach the first annular structure from the second annular structure;

the second tab includes a second thin section in a second bridging portion arranged between the third and fourth annular structures, the second tab being configured to separate along the second thin section when a tearing operation is performed on the second tab to thereby physically detach the third annular structure from the fourth annular structure, the container carrier is configured to separate into a first truncated carrier and a second truncated carrier when tearing operations are performed on both the first tab and second tab, the first truncated carrier comprising the first and third annular structures, and the second truncated carrier comprising the second and fourth annular structures, and the first tab and the second tab remain attached to one of the first truncated carrier and the second truncated carrier after the container carrier is separated into the first truncated carrier and the second truncated carrier.

\* \* \* \* \*